(12) United States Patent
Smits

(10) Patent No.: US 7,302,089 B1
(45) Date of Patent: Nov. 27, 2007

(54) AUTONOMOUS OPTICAL WAKE-UP INTELLIGENT SENSOR CIRCUIT

(75) Inventor: Gerard Dirk Smits, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 675 days.

(21) Appl. No.: 10/834,571

(22) Filed: Apr. 29, 2004

(51) Int. Cl.
*G06K 9/00* (2006.01)
(52) U.S. Cl. .................. 382/124; 382/218; 382/166
(58) Field of Classification Search .............. 382/124, 382/218, 166
See application file for complete search history.

(56) References Cited

U.S. PATENT DOCUMENTS

| | | | |
|---|---|---|---|
| 5,727,221 A | 3/1998 | Walsh et al. | |
| 5,864,702 A | 1/1999 | Walsh et al. | |
| 5,872,983 A | 2/1999 | Walsh et al. | |
| 5,977,902 A * | 11/1999 | Magne et al. | 342/53 |
| 6,559,769 B2 | 5/2003 | Anthony et al. | |
| 6,563,532 B1 | 5/2003 | Strub et al. | |
| 6,594,629 B1 | 7/2003 | Basu et al. | |
| 6,665,805 B1 | 12/2003 | Tsirkel et al. | |
| 6,700,606 B1 | 3/2004 | Borza | |
| 6,720,712 B2 | 4/2004 | Scott et al. | |
| 6,919,803 B2 * | 7/2005 | Breed | 340/539.14 |
| 2002/0034319 A1 | 3/2002 | Tumey et al. | |
| 2002/0065872 A1* | 5/2002 | Genske et al. | 709/202 |
| 2002/0095608 A1 | 7/2002 | Slevin | |
| 2002/0097145 A1 | 7/2002 | Tumey et al. | |
| 2002/0135584 A1* | 9/2002 | Lee | 345/531 |
| 2004/0034783 A1 | 2/2004 | Fedronic et al. | |
| 2004/0073827 A1 | 4/2004 | Tsirkel et al. | |

(Continued)

FOREIGN PATENT DOCUMENTS

EP 1 437 639 A2 7/2004

(Continued)

OTHER PUBLICATIONS

Bveong Hwan Jeon, Sang Uk Lee, and Kyoung Mu Lee, Pascal No. 04-0060581, Face Detection Using the 1st-Order RCE Classifier, International Conference on Image Processing, Sep. 22-25, 2002, Rochester, New York, Proceedings—International Conference on Image Processing, 2002 II.125-II128, United States.

(Continued)

*Primary Examiner*—Matthew C. Bella
*Assistant Examiner*—Mike Rahmjoo
(74) *Attorney, Agent, or Firm*—Darby & Darby PC; John W. Branch

(57) ABSTRACT

Devices, modules, and methods enable a mobile device to change from a standby mode with low power consumption to an active mode with relatively higher power consumption, upon recognizing that a received image is substantially similar to a visual signature. The visual signature is based on an image, such as the face of the intended user, is stored in a memory. When later the mobile device is in the standby mode, it periodically performs a low power peek with a camera to receive an image of the area in front of the mobile device. If the received image is recognized as substantially related to the visual signature, the mobile device is enabled to change from the standby mode to the active mode.

28 Claims, 19 Drawing Sheets

U.S. PATENT DOCUMENTS

2004/0081337 A1 4/2004 Tsirkel et al.
2005/0041840 A1* 2/2005 Lo .......................... 382/118

FOREIGN PATENT DOCUMENTS

| JP | 9-16296 | 1/1997 |
| JP | 11-242733 | 9/1999 |
| JP | 2001-5550 | 1/2001 |
| JP | 2001-202517 | 7/2001 |
| JP | 2003-78671 | 3/2003 |
| SE | 0202194-7 | 5/2004 |
| WO | WO-200/007276 A1 | 1/2004 |

OTHER PUBLICATIONS

Goel, S.; Shaaban, M.; Darwish, T.; Mahmoud, H.; Bayoumi, M., Inspec Abstract No. B2004-09-6135-418, Memory Accesses Reduction for MIME Algorithm, 2003 IEEE International Conference on Multimedia and Expo, Jul. 6-9, 2003, Baltimore, Maryland, Proceedings—1003 International Conference on Multimedia and Expo Part vol. 2 p. II-805-8 vol. 2, IEEE (Piscataway, NJ, USA), United States.

Gopalakrishnan, C., Katkoori, S., and Gupta, S., Inspec Abstract No. B2003-09-1265B-013, Power Optimisation of Combinational Circuits by Input Transformations, IEE Proceedings—Computers and Digital Techniques vol. 150, No. 3, p. 133-42, IEE, May 19, 2003, United Kingdom.

Kremer, U., Hicks, J., and Rehg, J., Inspec Abstract No. 2004-02-6150C-004, A Compilation Framework for Power and Energy Management on Mobile Computers, Languages and Compilers for Parallel Computing—14th International workshop, LCPC 2001, Revised Papers (Lecture Notes in Computer Science vol. 2624) p. 115-31, Springer-Verlag (Berlin, Germany), 2003, Germany.

* cited by examiner

AUTONOMOUS OPTICAL WAKE-UP INTELLIGENT SENSOR CIRCUIT

FIELD OF THE INVENTION

The present invention is related to the field of mobile devices, and more specifically to conserving electrical power in mobile devices.

BACKGROUND OF THE INVENTION

Mobile devices such as cell phones, personal digital assistants (PDAs) and the like, have become pervasive in modern society. Although some mobile devices are powered by solar cells and fuel cells, most are powered by batteries, which periodically need recharging or replacement.

To prolong battery life, a standby or "sleep" mode has been used to conserve power when a mobile device was not currently in use. In the sleep mode, some of the mobile device's components are substantially turned off, or arranged in a state that consumes less power from the battery. For example, in the sleep mode, a display for a mobile device could be dimmed or turned off, thereby reducing power consumption and prolonging battery life.

Typically, the sleep mode is entered into when the mobile device is not used for some period of time. The sleep mode is usually exited by some other interaction with the mobile device, e.g., actuating a control, receiving a message, receiving a telephone call, and the like. However, sometimes an interaction with a control can occur inadvertently, such as when the mobile device is jostled by the user.

BRIEF DESCRIPTION OF THE DRAWINGS

The invention will become more readily apparent from the following Detailed Description, which proceeds with reference to the drawings, in which.

DETAILED DESCRIPTION

Figure 1:
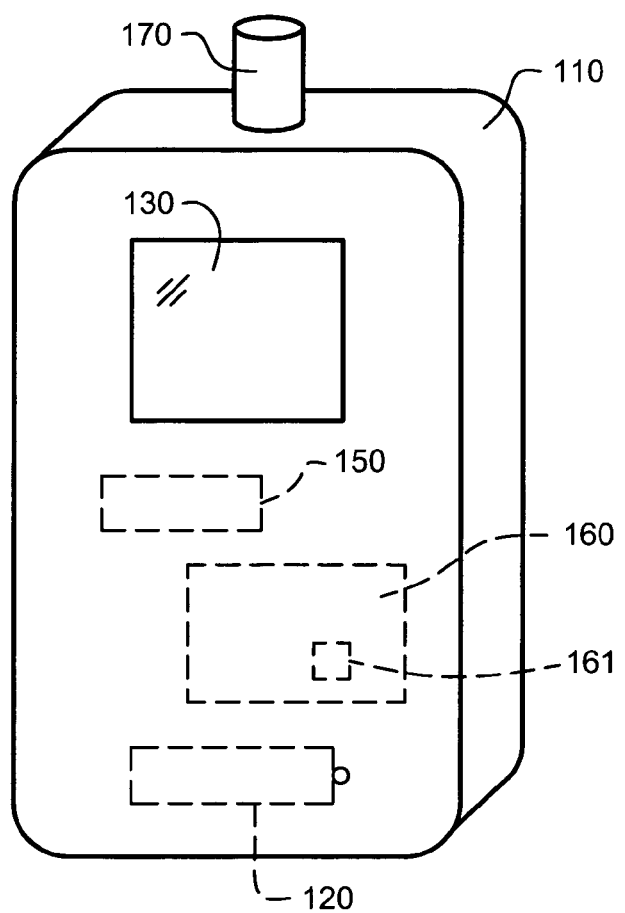
FIG. 1 is a perspective drawing of a mobile device having a camera.

The present invention is now described. While it is disclosed in its preferred form, the specific embodiments of the invention as disclosed and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Briefly, the invention enables a mobile device operating in a standby mode with relatively low power consumption to employ a "peek" at a scene in front of the mobile device for determining if the mobile device should change to an active mode with relatively high power consumption. In response to an event, the mobile device's camera is energized with enough power to peek at the scene in front of the camera. If the peek provides an image with characteristics that are substantially related to a previously stored visual signature that is based on a previously determined target image, then the mobile device is enabled to change from the standby mode to the active mode. However, if the peek image is not substantially related to the previously stored visual signature, then the camera is de-energized until another event occurs. Additionally, the event can be one or more actions, including, but not limited to, receiving a message, receiving a telephone call, a periodic timer, and actuation of a control on the mobile device. Moreover, the peek at the scene in front of the mobile device is typically performed with components that are relatively inexpensive and which consume relatively little power.

In one embodiment, the peek provides a relatively low resolution image, either with the camera or another imaging device that is coupled to the mobile device. If the low resolution image is substantially related to the visual signature, then the mobile device changes from the standby mode to the active mode.

In another embodiment, the camera operates at a relatively low resolution for a first peek. If the first peek provides an image that is substantially related to the visual signature, the camera takes a second peek at a relatively high resolution to provide another image that is compared to the visual signature. If the other image is determined to be substantially related to the visual signature, the mobile device changes from the standby mode to the active mode. However, if the other image is determined to not be substantially related, the mobile device remains in the standby mode and the camera switches back to operating at the relatively low resolution.

In one embodiment, the visual signature of the target image can be generated and stored during a training session with the mobile device. Also, during the training session, a display could prompt the user to center their face with regard to the lens of the camera. Also, multiple target images could be stored in a memory for generating a visual signature that could be subsequently compared to characteristics of an image provided from a peek. In another embodiment, an infrared light could be employed to provide an image of the user's face for the target image.

In another embodiment, the visual signature can be based on a predetermined target image. The predetermined target image could be a generic portrait or selected from a plurality of images. Additionally, the target image's visual signature can include one or more characteristics associated with the target image, including, but not limited to color, geometry, facial features, gray scale, picture, and the like.

A timer that causes periodic peeking may be accelerated or slowed down, depending on different circumstances such as the length of time that the mobile device has been in a standby mode. In one embodiment, the peek can be employed to limit use of the mobile device in the active mode for an authorized user.

In one embodiment, an application is employed to determine if the image provided by a peek is substantially related to the visual signature. The application can employ one or more methods to make the determination, including fuzzy logic, neural networks, look-up tables, artificial intelligence, and the like.

Operating Environment

FIG. 1 is a drawing of mobile device 100, which includes housing 110, battery 120 and display 130. It also includes other components, such as an antenna for wireless communication, and the like. Processor 150 is in communication with memory 160, which stores at least one target image 161.

In mobile device 100, camera 170 is provided for receiving an image of a scene. If processor 150 recognizes the received image as suitably related to target image 161, then processor 150 can enable device 100 to switch from a sleep mode to an active mode. Recognition may be conditioned on the received image being sufficiently similar to the target image.

Figure 2:
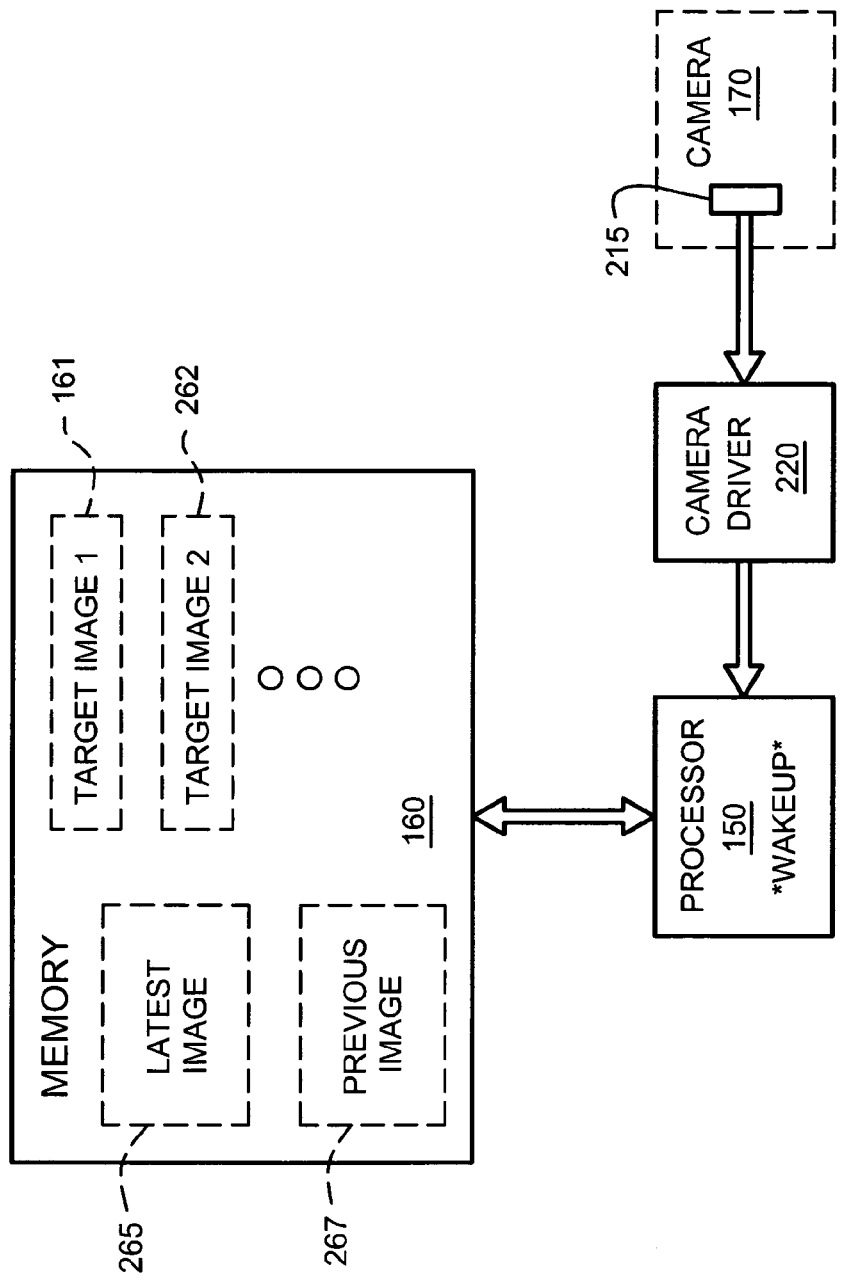
FIG. 2 is a block diagram of functional components of the mobile device of FIG. 1.

FIG. 2 is a block diagram of functional components of mobile device 100. Some of these components are substantially similar to those mentioned in FIG. 1. In addition, camera 170 includes sensor array 215 for receiving an image provided by a peek, along with possibly other optical components, such as an objective lens and the like. Camera 170 is controlled by camera driver 220, and the received image can be encoded for processing by processor 150.

In addition, memory 160 may include another stored target image 262. Further, memory 160 may define blocks 265, 267 for storing current and previously received target images provided by peeks. In one embodiment, if the just received target image is to be stored at block 265, then an earlier image stored at block 265 is advantageously first copied onto block 267, writing over it.

If processor 150 determines that the received image is related to either of target image 161 or target image 262, then it may enable the mobile device to switch from the standby mode to the active mode. Also, processor 150 may enable the image determination function and other functions for mobile device 100. Similarly, memory 160 may further include other data for performing other functions.

Figure 3:
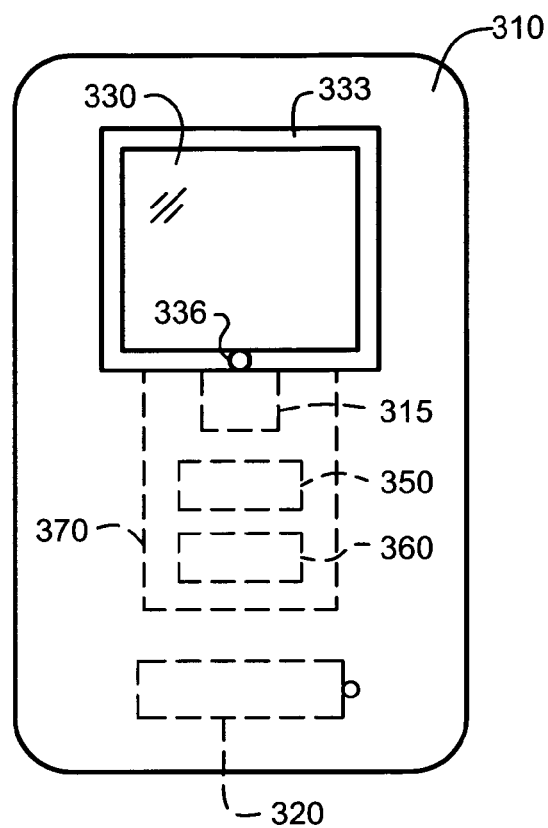
FIG. 3 is a drawing of another mobile device.
Figure 4:
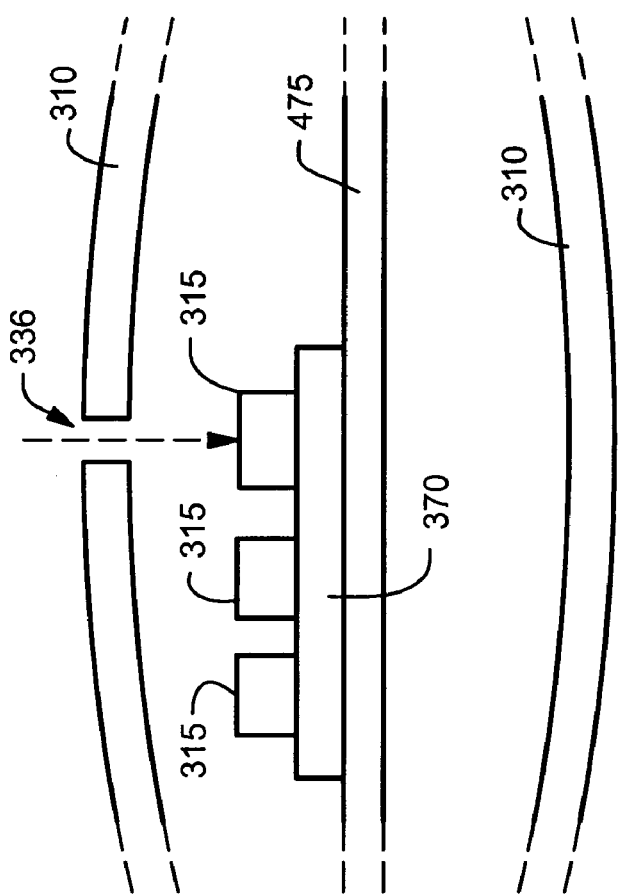
FIG. 4 is a section diagram of the device of FIG. 3.

FIG. 3 is a drawing of mobile device 300 that includes housing 310, battery 320, and display 330. Also, FIG. 4 is a section diagram of mobile device 300 that shows one embodiment of the arrangement of some of its components. Referring now to both FIG. 3 and FIG. 4, processor 350 cooperates with memory 360, which can store at least one target image. Sensor array 315 is adapted to receive a peek image of a scene in front of the mobile device. In addition, one or more other optical components may be used to present a peek image for receiving by sensor array 315.

Sensor array 315 receives the peek image through an aperture 336 in housing 310. In one embodiment, aperture 336 is provided within bezel 333 of display 330. If processor 350 recognizes the received peek image as at least substantially related to at least one target image, processor 350 enables mobile device 300 to change from a standby mode to an active mode.

In mobile device 300, sensor array 315, processor 350, and memory 360 can be provided on dedicated board 370, as a single module. Alternately, they might be provided on at least one other board 475 within housing 310, which could include other components for device 300.

Figure 5A:
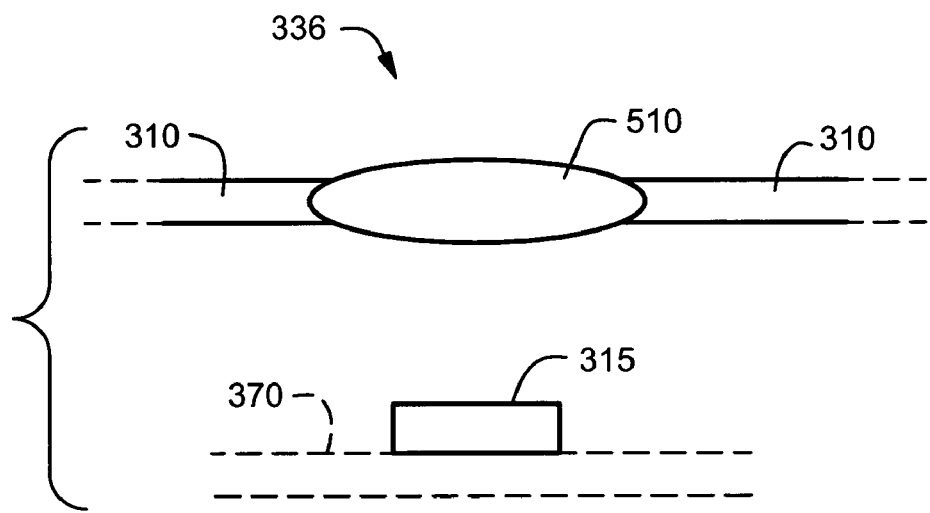
FIG. 5A is a detail of a first arrangement of an array relative to an aperture of FIG. 4.

FIG. 5A is a diagram showing a possible arrangement of array 315 relative to aperture 336. Lens 510 is provided at aperture 336. Board 370 is arranged such that array 315 is placed at a focal plane of lens 510.

Figure 5B:
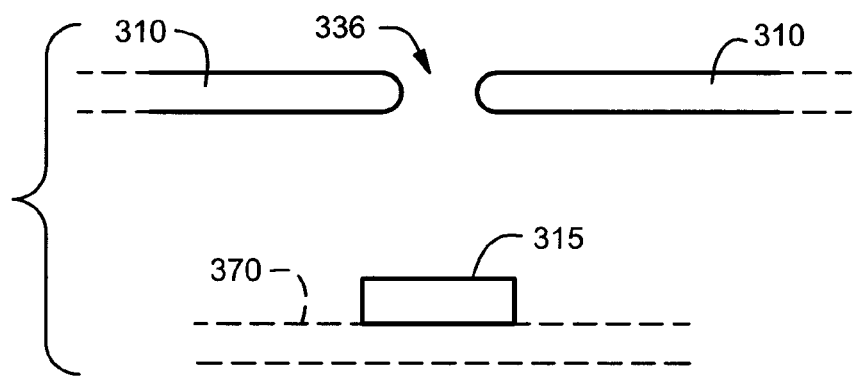
FIG. 5B is a detail of a second arrangement of an array relative to an aperture of FIG. 4.

FIG. 5B is a diagram showing another arrangement of sensor array 315 relative to aperture 336. In this embodiment, aperture 336 is a pinhole opening. Board 370 is arranged such that an inverted image is received on array 315.

Figure 6:
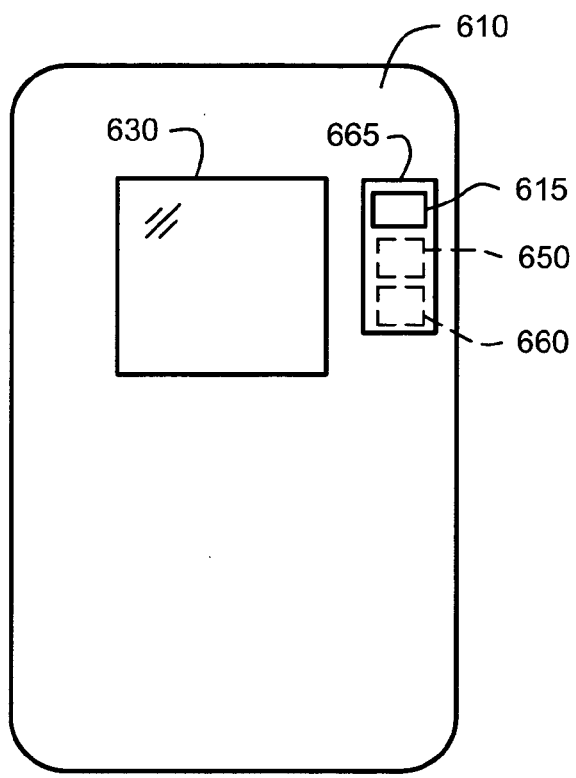
FIG. 6 is a diagram of yet another mobile device.

FIG. 6 is a diagram of mobile device 600 that includes housing 610, display 630, and wake-up module 665 externally attached to housing 610. One location for attaching might be adjacent to display 630, which the user is likely to be facing, so that sensor array 615 faces the user. Wake-up module 665 also includes at least processor 650 and memory 660.

Figure 7:
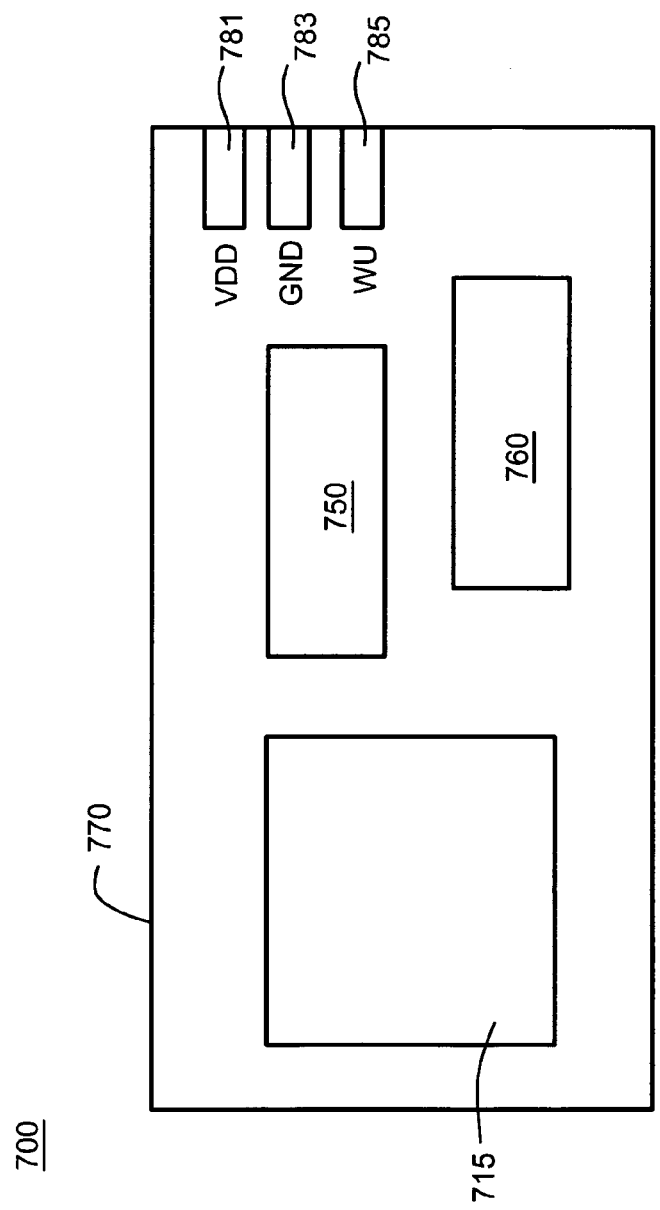
FIG. 7 is a diagram of a module.

FIG. 7 is a diagram of module 700, which may be provided as a standalone unit for integrating with a mobile device, either internally or externally. Integration may be either internal or external. Module 700 includes board 770 and sensor array 715. In one embodiment, sensor array 715 is a 16×16 pixel array, and may be implemented with CMOS based devices. Each pixel may have an output that includes logical ones or zeroes that represent gray scales, color values, and the like. Also, the received image may be further processed with other applications, such as smoothing, dithering, and the like.

Dedicated processor 750 and dedicated memory 760 may further be provided on board 770, or on a similar structure. Memory 760 may be organized to store operational programs, images and/or data for processor 750. Also, if board 770 is externally attached to the mobile device, a cover may be included that is substantially similar to the cover shown in FIG. 6.

Memory 760 can store one or more target images. Sensor array 715 is adapted to receive an image, and processor 750 is employed to determine whether the received image is recognized as at least related to one of the target images stored in memory 760. If that is the case, then processor 750 can generate a wake-up signal for the mobile device.

Module 700 further includes terminal 781 (VDD), terminal 783 (GND) for receiving electrical power. Terminal 785 (WU) is provided for outputting a wake-up signal. Terminals 781, 783, 785 may be provided on board 770. More terminals may be included with module 700 to provide the received image to the mobile device, for displaying and possibly other processing.

In addition, module 700 may include at least one optical component positioned to present an image of a scene for receiving by sensor array 715. In one embodiment, as shown in FIG. 5A, the mobile device includes housing 310 with an aperture 336, a sensor array (not shown) disposed within housing 310, and the optical component includes lens 510 at aperture 336. In one embodiment, lens 510 may be a micro-lens. In another embodiment, the optical component can be attached to module 700.

Figure 8A:
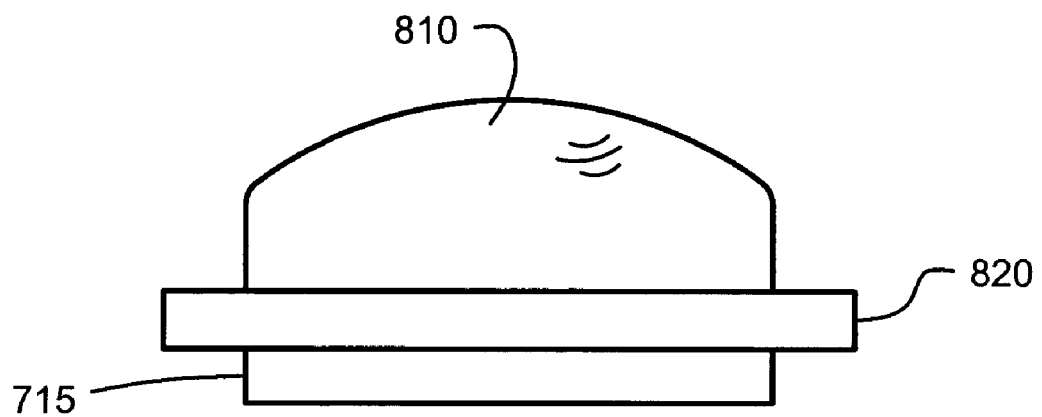
FIG. 8A is a detail of a first embodiment of an array of the module of FIG. 7.

FIG. 8A is a section view of one embodiment showing sensor array 715, and lens 810 for presenting the image to the array. In one embodiment, lens 810 may be in the form of a partial bubble, and may be a micro-lens. Spacer 820 is provided between lens 810 and array 715 to focus the image on the array.

Figure 8B:
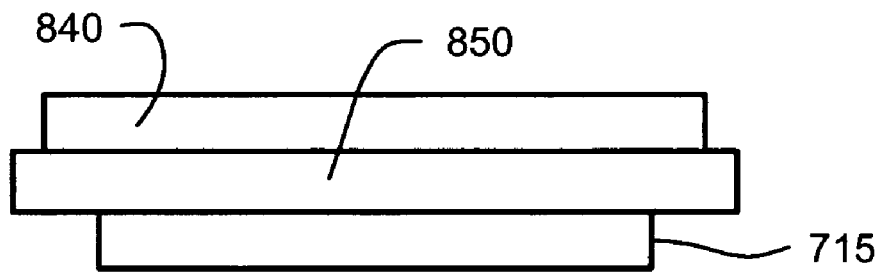
FIG. 8B is a detail of a second embodiment of an array of the module of FIG. 7.

FIG. 8B is a section view of another embodiment showing sensor array 715, and fresnel lens 840 for presenting the image to the array. In one embodiment, Fresnel lens 840 may be generally flat, and the refractive index variations can be formed by processing. Spacer 850 is provided between fresnel lens 840 and array 715, so as to focus the properly at one of the focal planes of fresnel lens 840.

FlowCharts

The following section is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention.

Often, for the sake of convenience only, it is preferred to implement and describe a program as various interconnected distinct software modules or features, individually and collectively also known as software. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it need not be a single memory, or even a single machine. Various portions, modules or features of it may reside in separate memories, or even separate machines. The separate machines may be connected directly, or through a network, such as a local access network (LAN), a wireless communication network, a global network, the Internet, and the like.

Figure 9:
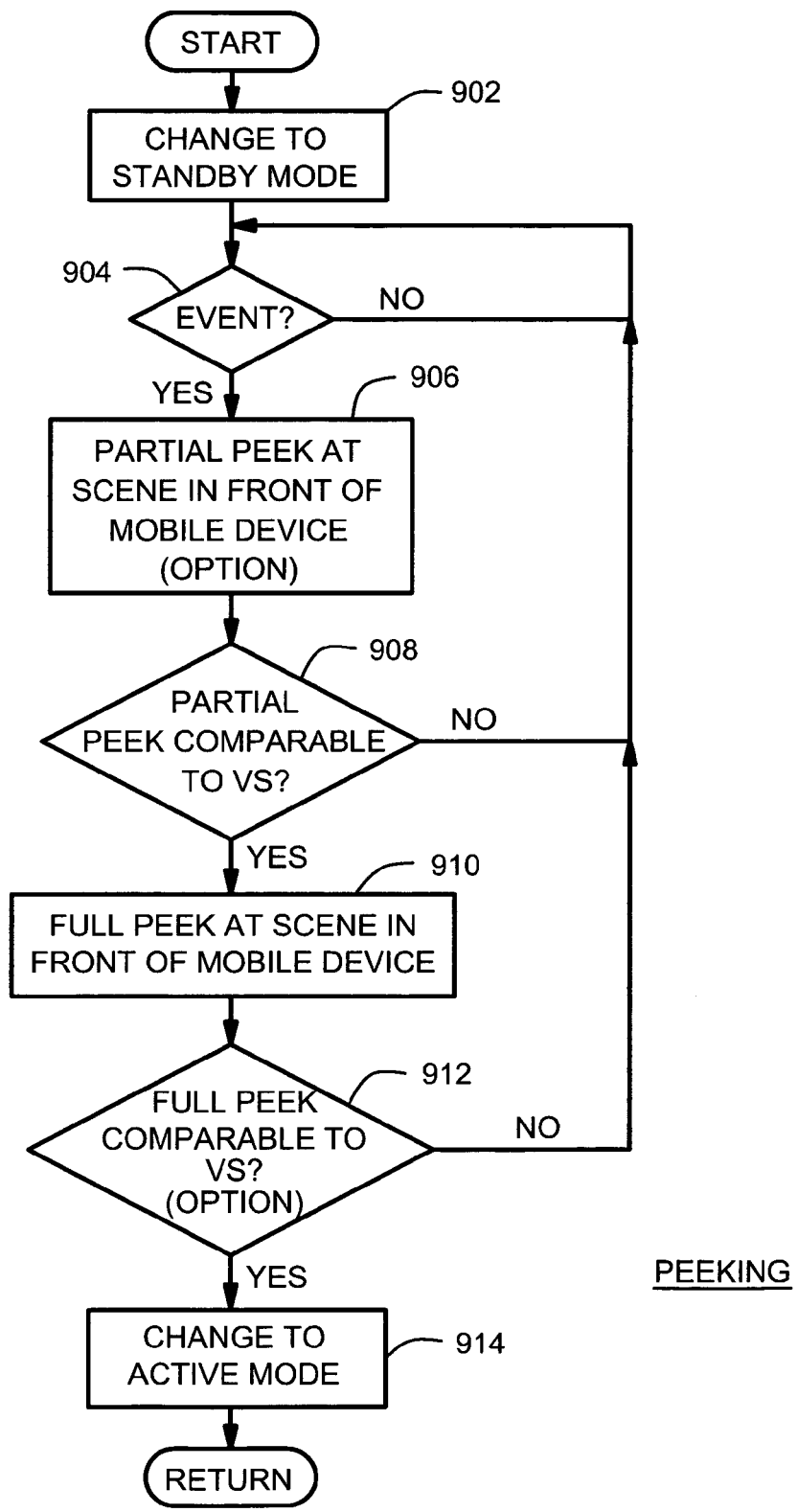
FIG. 9 is a flowchart illustrating process for peeking.

FIG. 9 shows flowchart illustrating a process for employing a multi-state "peek" cycle to determine if a mobile device should change from a standby mode to an active mode. Moving from a start block, the process steps to block 902 where the mobile device changes from an active mode to a standby mode that enables the mobile device to conserve power consumption as discussed above. Flowing from block 902, the process advances to decision block 904 where a determination is made as to whether an event has occurred. If false, the process loops until the determination is true.

Once the determination at decision block 904 is true, the process moves to optional block 906. At optional block 906, a camera coupled to the mobile device takes a partial "peek" image of the scene disposed in front of the interface for the mobile device. Advancing to optional decision block 908, the characteristics of the partial peek image are compared to a visual signature that has been previously provided. If the comparison determines that the partial peek image is not comparable to the visual signature, then the process loops back to decision block 904 where substantially the same actions discussed above are repeated. Additionally, in one embodiment, the partial peek image can have a relatively low resolution.

However, if the determination at optional decision block 908 is affirmative, the process flows to block 910 where a full peek image is taken of the scene in front of the mobile device at a higher resolution. The process flows to decision block 912 where the full peek image is compared to the previously provided visual signature. If this comparison is false, the process loops back to decision block 904 where substantially the same actions discussed above are repeated. But, if the determination at decision block 912 is true, the process steps to block 914 where the mobile device is enabled to change from a standby mode to an active mode. Next, the process returns to processing other actions. Additionally, in one embodiment, the full peek image can have a relatively high resolution.

Figure 10A:
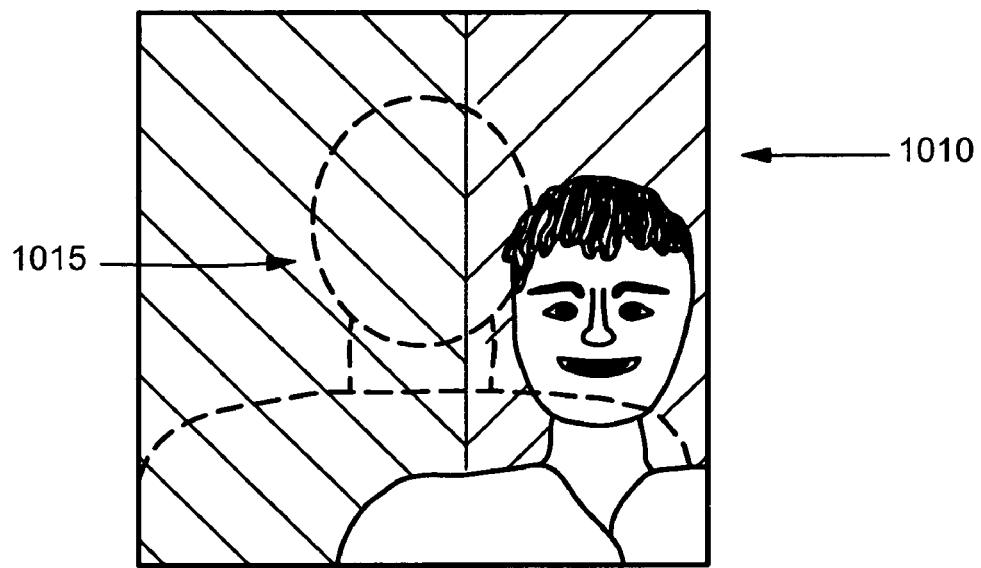
FIG. 10A is a first sample target image received during training.
Figure 10B:
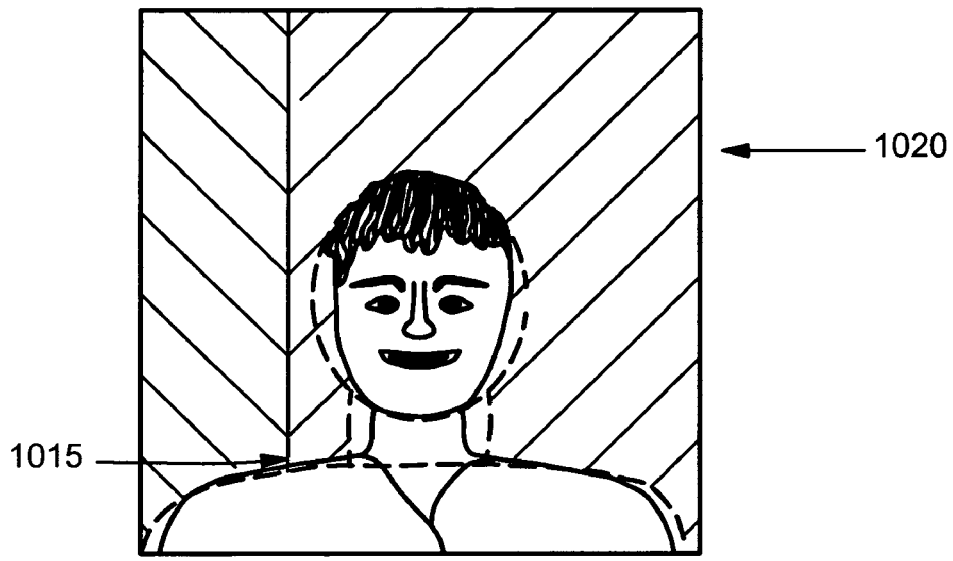
FIG. 10B is a second and adjusted sample target image received during training.

FIG. 10A shows sample target image 1010, as it may be displayed with a mobile device. Target image 1010 may be deemed not satisfactory, because the face of the user is not centered in the field of view. A prompt such as training contour 1015 may be displayed, to help the user adjust the position of their face. If training contour 1015 is indeed provided, it may provide a baseline for determining whether the target image is satisfactory, such as computing a matching score, and the like. FIG. 10B shows sample target image 1020, which may be deemed satisfactory, and is stored.

Figure 10C:
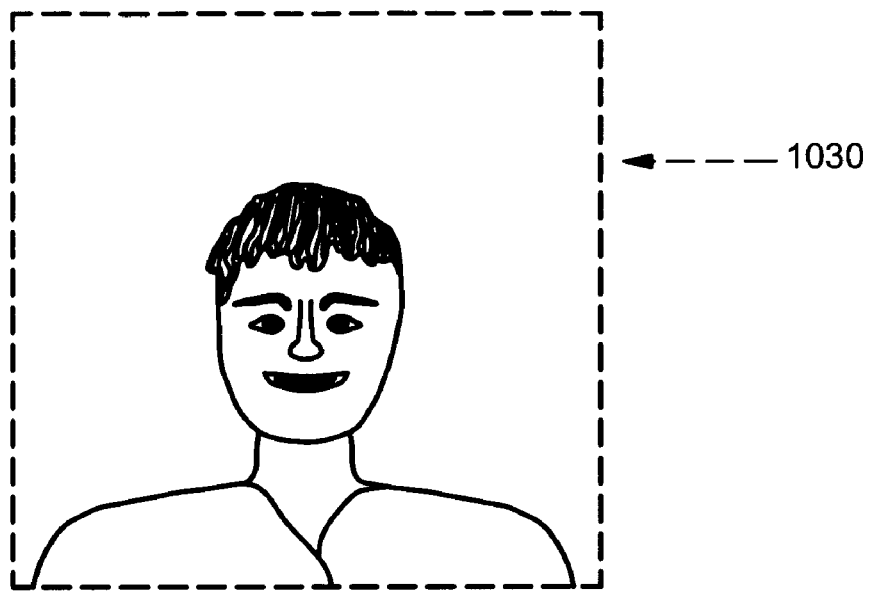
FIG. 10C is a target image extracted from the sample target image of FIG. 10B.

FIG. 10C shows sample target image 1030 being extracted from sample target image 1020 of FIG. 10B. As can be seen in this example, a broad outline has been retained, while the background of the training scene has been discarded.

In one embodiment that involves a sensor array, a partial peek may be performed with fewer than all the available pixels. For example, a portion may be enabled so as to determine if there is ambient light. If no, peeking with substantially all the pixels can be delayed. If there is enough light, then substantially more pixels could be used to perform a full peek and receive an image.

Figure 11A:
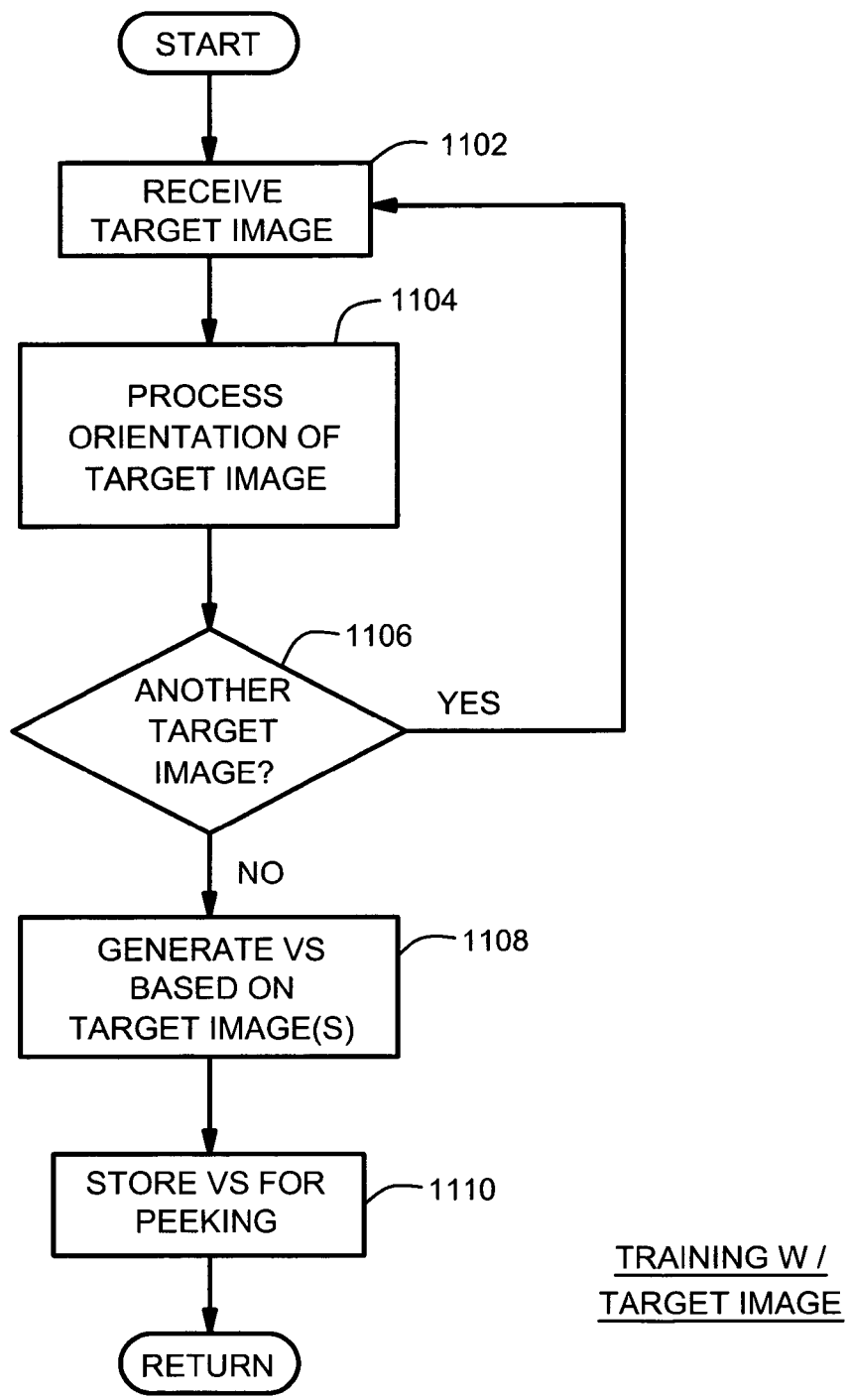
FIG. 11A is a flowchart illustrating a method for employing images captured with a camera to generate a visual signature.

FIG. 11A illustrates a flow chart for training with a target image that is captured with a camera in communication with the mobile device. Moving from a start block, the process steps to block 1102 where the target image of a scene in front of the mobile device is received from the camera. At block 1104, the orientation of the received target image is adjusted as required based on different factors, including a training contour, dithering, smoothing, and the like.

Next, the process flows to decision block 1106 where a determination is made as to whether another target image is to be captured by the camera. If true, the process loops back to block 1102 and substantially repeats the method discussed above. However, if the determination is false, the process advances to block 1108 where the visual signature is generated based on one or more captured target image. The process flows to block 1110 where the visual signature is stored for peeking at a later date. The process then returns to processing other actions.

Figure 11B:
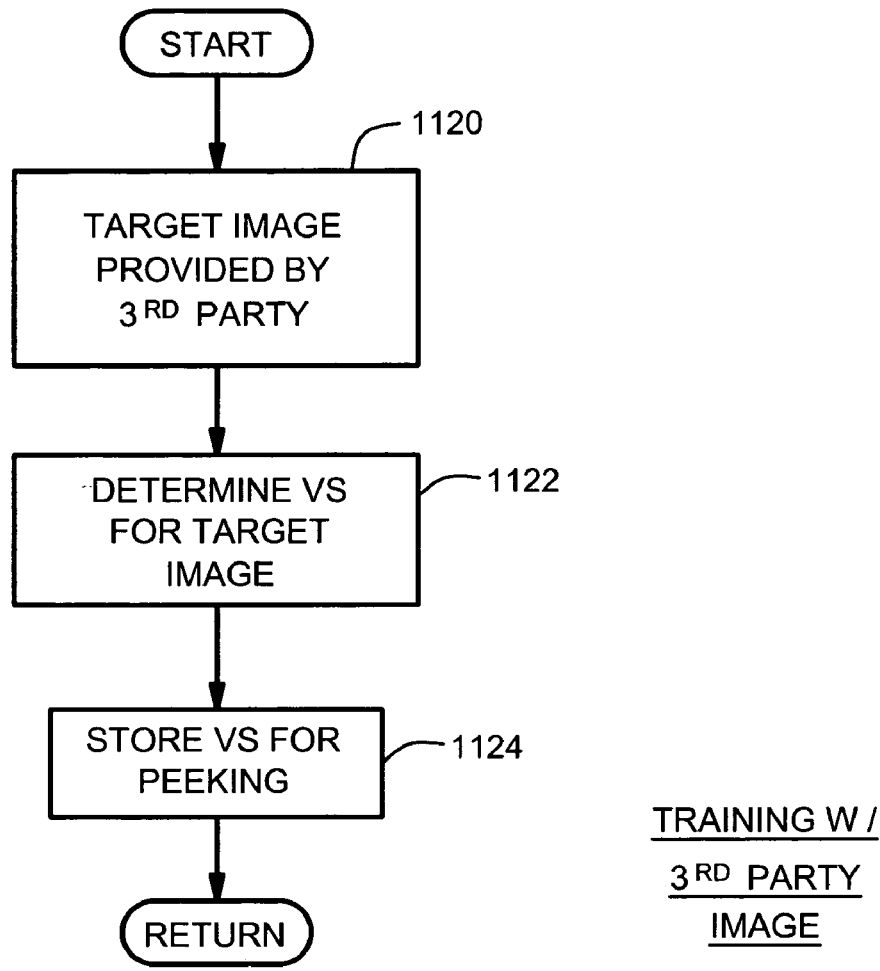
FIG. 11B is a flowchart illustrating a method for receiving a target image from a third party.

FIG. 11B illustrates a flow chart for handling a target image provided by a third party. Moving from a start block, the process steps to block 1120 where a target image is provided by a third party to the mobile device. The third party provides the target image as content through one or more means of communication, including, but not limited to, a web site or physical media.

Next, process flows to block 1122 where a visual signature is determined for the third party provided target image. Advancing to block 1124, the process stores the visual signature for peeking at a later date. Lastly, the process returns to performing other actions.

Figure 11C:
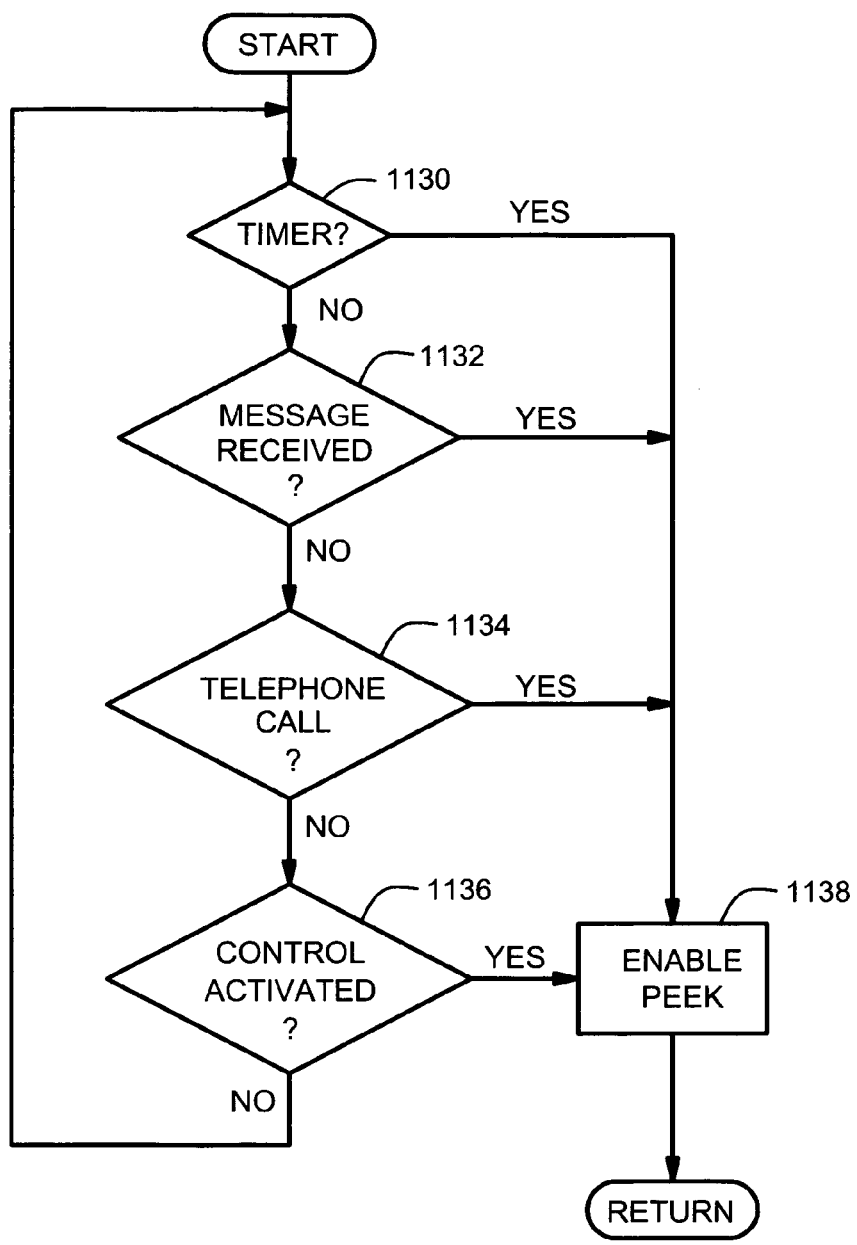
FIG. 11C is a flowchart illustrating a process for determining if at least one event has occurred that will cause the enablement of the peeking process.

FIG. 11C illustrates a flow chart for determining the occurrence of an event that will trigger a peek. Moving from a start block, the process steps to block 1130 where a determination is made as to whether a predetermined period of time has expired. If yes, the process jumps to block 138 where a peek is enabled for the mobile device. Next, the process returns to performing other actions.

However, if the determination at decision block 1130 is negative, the process advances to decision block 1132 where a determination is made as to whether a message was received. The message could come in a variety of different formats, including but not limited to, email, alert, Short Message Service (SMS), Multi-Media Message Service (MMS) and instant messaging (IM). If the determination at decision block 1132 is affirmative, the process advances to block 138 where substantially the same actions discussed above are repeated.

Alternatively, if the determination at decision block 1132 are negative, process advances to decision block 1134 where a determination is made as to whether a telephone call has been received at the mobile device. If true, the process will advance to block 138 where substantially the same actions discussed above are repeated. However, if the determination at decision block 1134 is negative, the process would advance to decision block 1136 where a determination is made as to whether a control of the mobile device has been activated, e.g., buttons on the mobile device are actuated. If true, the process will advance to block 138 where substantially the same actions discussed above are repeated. However, if the determination at decision block 1136 is negative, the process loops back to decision block 1130 where substantially the same actions discussed above are repeated.

Figure 12A:
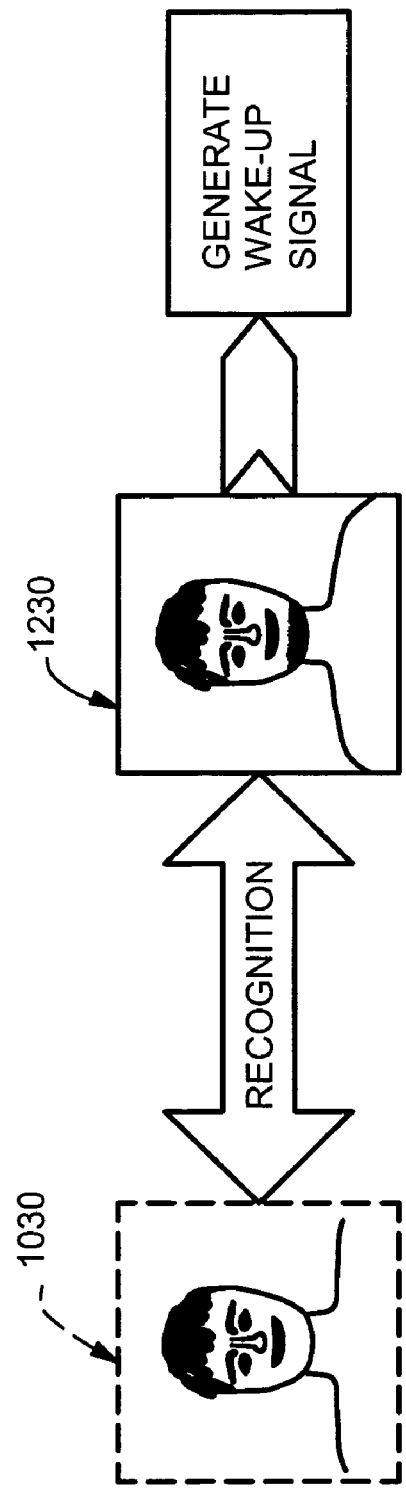
FIG. 12A depicts a recognition of a received image as the target image of FIG. 10C.

FIG. 12A depicts a situation where a match is determined between received image 1230 and target image 1030 of FIG. 10C. The images are deemed similar enough.

Figure 12B:
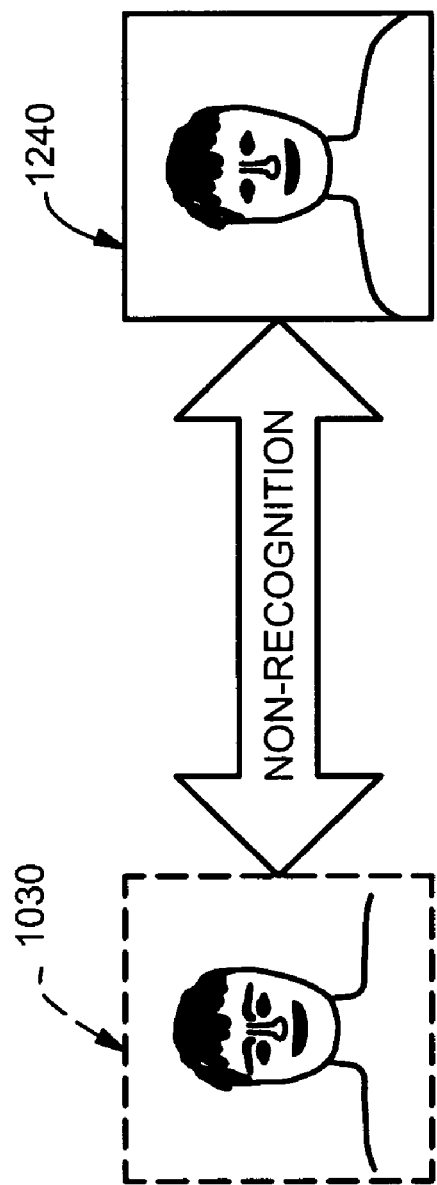
FIG. 12B depicts a non-recognition of a received image as the target image of FIG. 10C according to an embodiment of the invention.

FIG. 12B depicts a situation where no match is determined between received image 1240 with the target image of FIG. 10C. The images are not deemed similar enough.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An apparatus adapted for a mobile device, comprising:
a memory to store a visual signature; and
a processor, that performs actions, including:
in response to an event, enabling a sensor array to receive an image based on at least one peek at a scene adjacent to the mobile device; and
if the received image is determined to be substantially related to the visual signature, enabling the mobile device to change from the standby mode to an active mode, wherein the mobile device consumes relatively less power when operating in the standby mode than when operating in the active mode; and if the mobile device is enabled to change from the standby mode to the active mode, employing the sensor array to receive another image based on another peek at the scene adjacent to the mobile device, wherein the other received image is a relatively higher resolution than a relatively lower resolution of the received image; if the other received image is determined to be unrelated to the visual signature, enabling the mobile device to remain in the standby mode.

2. The apparatus of claim 1, wherein the sensor array employs a portion of its photo-sensitive elements to receive the image based on the at least one peek.

3. The apparatus of claim 1, wherein the received image is a relatively low resolution image.

4. The apparatus of claim 1, wherein the visual signature includes at least one value for geometry, color, facial features, picture, and gray scale.

5. The apparatus of claim 1, wherein the event is at least one of a timer, received message, received telephone call, and an actuation of a control.

6. The apparatus of claim 1, wherein the event is an expiration of a periodic timer having an adjustable period of time.

7. The apparatus of claim 1, further comprises employing an application to determine if the received image is substantially related to the visual signature, and wherein the application includes at least one of fuzzy logic, neural network, artificial intelligence, and look-up table.

8. The apparatus of claim 1, further comprising
receiving at least one target image of a user from the sensor array;
generating the visual signature from the at least one target image; and
storing the visual signature in the memory.

9. The apparatus of claim 1, further comprising:
receiving at least one target image from a third party resource;
generating the visual signature from the at least one target image; and
storing the visual signature in the memory.

10. The module of claim 9, wherein
the processor performs further actions, including:
if the received image is recognized as at least related to the visual signature, the entire sensor array is fully energized to peek at the scene and receive another image; and
if the received other image is substantially related to the visual signature, enabling the mobile device to change from the standby mode to the active mode.

11. The apparatus of claim 1, wherein
the processor and the sensor array are enclosed in a housing, and
the housing includes an aperture through which to receive the image.

12. The apparatus of claim 11, wherein
the aperture is a pinhole opening.

13. The apparatus of claim 1, further comprising:
a lens to receive the image.

14. The method of claim 1, further comprising:
receiving at least one target image from a third party resource;

generating the visual signature from the at least one target image; and storing the visual signature.

15. A method conserving power for a mobile device, comprising:

in response to an event, receiving an image based on at least one peek at a scene adjacent to the mobile device; and if the received image is determined to be substantially related to the visual signature, enabling the mobile device to change from the standby mode to an active mode, wherein the mobile device consumes relatively less power when operating in the standby mode than when operating in the active mode and if the mobile device is enabled to change from the standby mode to the active mode, receiving another image based on another peek at the scene adjacent to the mobile device, wherein the other received image is a relatively higher resolution than a relatively lower resolution of the received image; and if the other received image is determined to be unrelated to the visual signature, enabling the mobile device to remain in the standby mode.

16. The method of claim 15, wherein the image based on the at least one peek has a relatively low resolution.

17. The method of claim 15, wherein the visual signature includes at least one value for geometry, color, facial features, picture, and gray scale.

18. The method of claim 15, wherein the event is at least one of a timer, received message, received telephone call, and an actuation of a control.

19. The method of claim 15, wherein the event is an expiration of a periodic timer having an adjustable period of time.

20. The method of claim 15, further comprising employing an application to determine if the received image is substantially related to the visual signature, wherein the application includes at least one of fuzzy logic, neural network, artificial intelligence, and look-up table.

21. The method of claim 15, further comprising receiving at least one target image of a user;

generating the visual signature from the at least one target image; and storing the visual signature.

22. A module adapted for use with a mobile device, comprising:

a memory to store a visual signature;

a sensor array;

an optical component positioned to present an image for receiving by the sensor array; and a processor that performs actions, comprising:

enabling the sensor array to peek at a scene to receive an image; and if the received image is recognized as at least related to the visual signature, enabling the mobile device to change from a standby mode to an active mode and if the mobile device is enabled to change from the standby mode to the active mode, employing the sensor array to receive another image based on another peek at the scene adjacent to the mobile device, wherein the other received image is a relatively higher resolution than a relatively lower resolution of the received image; if the other received image is determined to be unrelated to the visual signature, enabling the mobile device to remain in the standby mode.

23. The module of claim 22, wherein at least one of the memory, sensor array, optical component, and processor are disposed on a board.

24. The module of claim 22, wherein the optical component includes at least one of a lens and a fresnel lens.

25. The module of claim 22, wherein the mobile device includes a housing with the optical component disposed on the sensor array on an outer side of the housing.

26. The module of claim 22, wherein the peek occurs at a periodic interval that is adjustable.

27. The module of claim 22, wherein a portion of the sensor array is energized to peek at the scene and receive the image.

28. An apparatus adapted for a mobile device, comprising:

a means for storing a visual signature; and a means for performing actions, including:

in response to an event, enabling a sensor array to receive an image based on at least one peek at a scene adjacent to the mobile device; and if the received image is determined to be substantially related to the visual signature, enabling the mobile device to change from the standby mode to an active mode, wherein the mobile device consumes relatively less power when operating in the standby mode than when operating in the active mode and if the mobile device is enabled to change from the standby mode to the active mode, employing the sensor array to receive another image based on another peek at the scene adjacent to the mobile device, wherein the other received image is a relatively higher resolution than a relatively lower resolution of the received image; if the other received image is determined to be unrelated to the visual signature, enabling the mobile device to remain in the standby mode.

* * * * *